Patented Aug. 11, 1925.

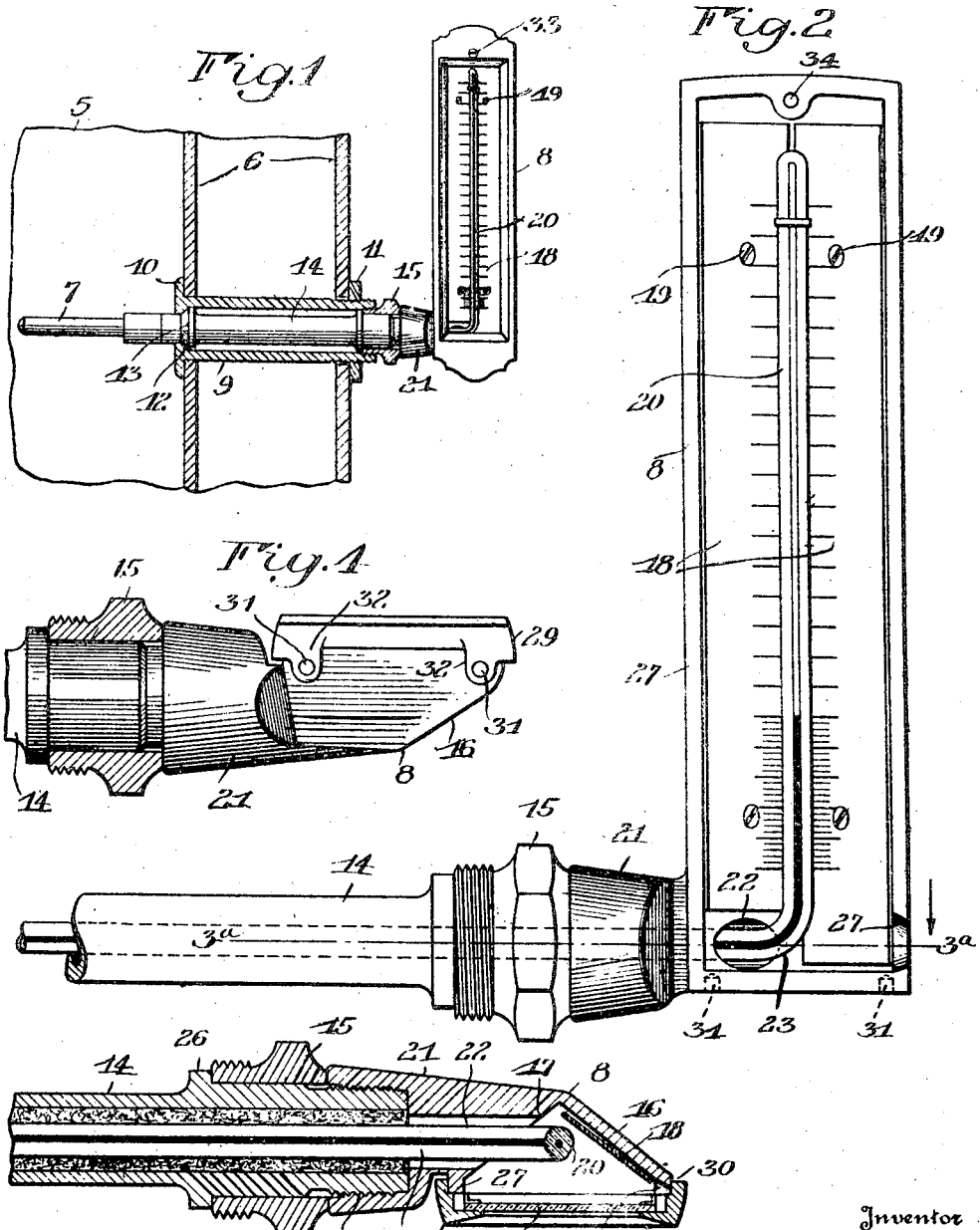

1,549,076

UNITED STATES PATENT OFFICE.

JAMES ELY, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

Application filed March 14, 1925. Serial No. 15,640.

*To all whom it may concern:*

Be it known that I, JAMES ELY, a citizen of the United States, residing at Rochester, in the county of Monroe and State of New York, have invented certain new and useful Improvements in Thermometers; and I do hereby declare the following to be a full, clear, and exact description of the same, reference being had to the accompanying drawings, forming a part of this specification, and to the reference numerals marked thereon.

This invention relates to thermometers of the indicating variety comprising a fluid filled bulb and stem provided with temperature graduations and relates more especially to the type of such thermometers known in the art as " side angle thermometers," the chief object of the invention being to provide a thermometer of this class having an improved mounting and casing embodying a more simple and economical form of construction.

To these and other ends the invention resides in certain improvements and combinations of parts, all as will be hereinafter more fully described, the novel features being pointed out in the claims at the end of the specification.

In the drawings:—

Figure 1 is an elevation of a thermometer embodying the present invention and showing the same applied to a tank or vat a portion of which is shown in section;

Figure 2 is an enlarged view of the thermometer partly broken away;

Figure 3 is a sectional view on the line 3ª—3ª in Figure 2, and

Figure 4 is a bottom view of a portion of the instrument partly in section.

Similar reference numerals throughout the several views indicate the same parts.

The present invention provides an improved thermometer of the so-called "side angle" type, particularly adapted for insertion through the wall of a container, such as a vat or tank, to indicate the temperature within the same. Thus, the thermometer is shown in Figure 1 as applied to a tank 5 having a double wall 6 through which the bulb portion 7 of the thermometer stem is inserted with the indicating portion or scale case 8 conveniently arranged for observation on the outside. The thermometer is fitted to the container wall in the present instance by means of a union connection comprising a hub or sleeve 9 inserted through openings in the walls, with a flange 10 at its inner end resting against the inner surface of the wall. A nut 11 on the outer end of the sleeve which projects exteriorly of the wall serves to draw the flange 10 tightly against the container wall and secure the sleeve in place. The sleeve has at its inner end a tapering seat 12 with which cooperates a tapered shoulder 13 on the metal casing 14 which encloses and protects the thermometer stem adjacent the bulb. A swivel nut 15 rotating on the casing, as more particularly described hereafter, engages the threaded outer end of the bore of sleeve 9 and serves to maintain the casing shoulder 13 against the seat 12 of the sleeve, so that the thermometer is mounted in the container wall by a fluid tight and detachable form of connection, as in the patent to Maurer, No. 1,233,385, July 17, 1917, thermometer holding device for tanks and the like.

The improved thermometer comprises a V-shaped scale case 8 with diverging walls 16 and 17, on which the scale plates 18 are secured, as by means of screws 19, adjacent and on opposite sides of the indicating portion 20 of the glass stem of the thermometer which is located in front of the intersection of the wall intersection.

Projecting laterally from the lower end of one side of the scale case is an integral casing extension 21 arranged with its axis parallel with the front of the scale case, as best shown in Figures 3 and 4. Extension 21 is formed with a central bore 22 opening through the wall 17 of the scale case into the latter and the thermometer stem has its lower end turned through a right angle as at 23, the angular portion of the stem being carried through the bore 22 of extension 21 and prolonged and provided with the casing 14 for mounting the same in the container wall as already described. The outer end of the casing is screw threaded as indicated at 25 and engaged in a threaded socket in the outer end of the scale case extension 21. Casing 14 is also formed with a flange or shoulder 26 between which and the end of the extension 21 the swivel nut 15 rotates for securing the casing and thermometer in the union connection.

The diverging walls 16 and 17 of the scale case are preferably provided with short forwardly extending wall portions 27 and the front of the case is closed by a glass 28 mounted in any suitable manner in a rectangular frame 29, the rearwardly extending walls of which embrace the front walls of the scale plate as at 30, thus tightly closing the latter. The frame 29 is detachably secured to the scale case in a simple and advantageous manner comprising the provision of dowel pins 31 projecting upwardly from lugs 32 extending rearwardly from the bottom of the frame. These dowel pins are engaged in sockets in the bottom of scale case. The frame is secured in engagement with the case by means of a screw 33 passed through the top of the frame and engaged in a threaded opening 34 in the top of the case. By the simple removal of screw 33, frame 29 is readily removed from the case for cleaning or repairing the instrument.

The invention thus provides a thermometer of the side angle type having a simple and practical form of construction capable of being manufactured and assembled for use at a comparatively low cost and affording an efficient instrument of pleasing appearance.

I claim as my invention:

1. A thermometer of the class described comprising a scale case having an integral casing extension projecting laterally from the lower end of one side thereof parallel with the front of said scale case, a stem in said case having an angular portion carried through said extension and provided with a bulb, and a frame embracing the front of said case having a glass mounted therein to close the same.

2. A thermometer of the class described comprising a scale case having an integral casing extension projecting laterally from the lower end of one side thereof parallel with the front of said scale case, a stem in said case having an angular portion carried through said extension and provided with a bulb, a glass for closing said scale case, and a frame for said glass embracing the front of said case and secured thereto at one end by a dowel pin and at the other end by a screw.

3. A thermometer of the class described comprising a V-shaped scale case having an integral casing extension projecting laterally from the lower end of one side thereof parallel with the front of said scale case, a stem in said scale case having an angular portion carried through said extension and provided with a bulb, a bulb casing having its end screwed into said extension, and a frame embracing and detachably secured to the front of said scale case having a glass for closing the same.

4. A thermometer of the class described comprising a V-shaped scale case having an integral casing extension projecting laterally from the lower end of one side thereof parallel with the front of said case, a stem in said scale case having an angular portion carried through said extension and provided with a bulb, a bulb casing having its end screwed into said extension, a glass closing the front of said scale case, and a frame for said glass embracing the front walls of said scale case and detachably secured thereto at one end by dowel pin means and at the other end by means of a screw.

JAMES ELY.